United States Patent
Barbier-Neveu et al.

(10) Patent No.: US 12,055,051 B2
(45) Date of Patent: Aug. 6, 2024

(54) BELLCRANK FOR A VARIABLE ADJUSTMENT DEVICE FOR A TURBOMACHINE

(71) Applicant: SAFRAN AIRCRAFT ENGINES, Paris (FR)

(72) Inventors: Clélia Antoinette Barbier-Neveu, Moissy-Cramayel (FR); Erick Jacques Boston, Moissy-Cramayel (FR); Yann Thierry Robert, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 31 days.

(21) Appl. No.: 17/630,197

(22) PCT Filed: Aug. 20, 2020

(86) PCT No.: PCT/FR2020/051489
§ 371 (c)(1),
(2) Date: Jan. 26, 2022

(87) PCT Pub. No.: WO2021/038161
PCT Pub. Date: Mar. 4, 2021

(65) Prior Publication Data
US 2022/0275732 A1    Sep. 1, 2022

(30) Foreign Application Priority Data
Aug. 27, 2019   (FR) ..................... 1909421

(51) Int. Cl.
*F01D 17/16* (2006.01)
*F01D 17/20* (2006.01)

(52) U.S. Cl.
CPC ........... *F01D 17/162* (2013.01); *F01D 17/20* (2013.01); *F05D 2220/323* (2013.01); *F05D 2260/50* (2013.01)

(58) Field of Classification Search
CPC .. F01D 17/162; F01D 17/20; F05D 2220/323; F05D 2260/50; F05D 2250/90; F02C 9/20; F04D 29/563
See application file for complete search history.

(56) References Cited

U.S. PATENT DOCUMENTS 6,076,423 A * 6/2000 Honda ..................... F16C 17/26
                                                                74/519
7,037,070 B2 * 5/2006 Raine ................... F04D 27/0246
                                                                415/149.4

(Continued)

FOREIGN PATENT DOCUMENTS

EP        0765992 A1    4/1997
FR        2856424 A1    12/2004

(Continued)

OTHER PUBLICATIONS

US 5,692,897 A, 12/1997, Charbonnel (withdrawn)
(Continued)

*Primary Examiner* — Brian P Wolcott
*Assistant Examiner* — Jesse M Prager
(74) *Attorney, Agent, or Firm* — Christensen O'Connor Johnson Kindness PLLC

(57) ABSTRACT

A bellcrank for a variable adjustment device for an aircraft turbomachine, is articulated respectively to a control housing, to a synchronization bar, to a piston stem of an actuator and to a turnbuckle. The bellcrank includes a part for articulation to the control housing which includes, on the one hand, a tab and, on the other hand, a tubular portion spaced apart from the tab, the tab and the tubular portion including orifices that are aligned and are configured to receive a common axis of articulation of the control housing.

11 Claims, 4 Drawing Sheets

(56) References Cited

U.S. PATENT DOCUMENTS

| | | |
|---|---|---|
| 7,307,070 B2 | 12/2007 | Heuer et al. |
| 8,591,173 B2 | 11/2013 | Bouru et al. |
| 2010/0278639 A1 | 11/2010 | Hood et al. |
| 2013/0341547 A1* | 12/2013 | LeBlanc ................. F01D 17/20 251/229 |
| 2019/0264706 A1* | 8/2019 | Awtry ....................... F02C 3/06 |

FOREIGN PATENT DOCUMENTS

| | | |
|---|---|---|
| FR | 2936559 A1 | 4/2010 |
| FR | 2960611 A1 | 12/2011 |
| FR | 3076325 A1 | 7/2019 |

OTHER PUBLICATIONS

Written Opinion of the International Searching Authority mailed on Dec. 7, 2020, issued in corresponding International Application No. PCT/FR2020/051489, filed on Aug. 20, 2020, 6 pages.

International Preliminary Report on Patentability mailed Mar. 1, 2022, issued in corresponding International Application No. PCT/FR2020/051489, filed on Aug. 20, 2020, 1 page.

English translation of the International Search Report mailed on Dec. 7, 2020, issued in corresponding International Application No. PCT/FR2020/051489, filed on Aug. 20, 2020, 2 pages.

English translation of the Written Opinion of the International Searching Authority, mailed on Dec. 7, 2020, issued in corresponding International Application No. PCT/FR2020/051489, filed on Aug. 20, 2020, 3 pages.

* cited by examiner

BELLCRANK FOR A VARIABLE ADJUSTMENT DEVICE FOR A TURBOMACHINE

CROSS-REFERENCES TO RELATED APPLICATIONS

This application is a National Stage of International Application No. PCT/FR2020/051489, filed Aug. 20, 2020, which claims priority to French Patent Application No. 1909421, filed Aug. 27, 2019, the entire disclosures of which are hereby incorporated by reference.

TECHNICAL FIELD OF THE INVENTION

The present invention relates to a bellcrank for a variable adjustment device for an aircraft turbomachine, as well as to an adjustment device comprising such a bellcrank.

BACKGROUND

The prior art is illustrated, for example, by the document FR-A1-2 960 611.

The variable stator vanes (also referred to as VSV) of a turbomachine are supported by an external annular casing, usually of a compressor of the turbomachine. Each vane comprises a blade which is connected at its radially external end by a plate of substantially circular outline to a radial cylindrical pivot which defines the axis of rotation of the vane and which is guided in rotation in a corresponding orifice in the external casing. The radially internal end of the blade of each vane generally comprises a second cylindrical pivot extending along the axis of rotation of the vane and rotatably guided in an orifice in an internal casing of the compressor.

The radially external end of the external pivot of each vane is connected by a lever or a connecting rod to a control ring rotated around the external casing by an actuator of the cylinder type or the like. The rotation of the control ring is transmitted by the connecting rods to the external pivots of the vanes and causes them to rotate around their axes.

The angular adjustment of the stator vanes in a turbomachine is intended to adapt the geometry of the compressor to its operating point and, in particular, to optimize the efficiency and the pumping margin of this turbomachine and to reduce its fuel consumption in the various flight configurations.

Each of these vanes is rotatable about its axis between a first "open" or "full open" position in which each vane extends substantially parallel to the longitudinal axis of the turbomachine, and a second "closed" or "near closed" position in which the vanes are inclined with respect to the axis of the turbomachine and thus reduce the passage cross-sectional area of the air through the stage of vanes.

The document FR-A1-2 856 424 of the applicant describes a device for variably adjusting two adjacent rows of vanes, which is shown in FIGS. 1 and 2 and comprises:
an actuator A attached to a casing 1,
a control box 12 attached to the casing 1,
control rings 5 intended to be mounted so as to rotate around the casing 1 in order to actuate the two rows of vanes 2,
a first connection system comprising a first four-joint bellcrank 7; the bellcrank 7 is articulated about a pivot 20 on the control box 12 and comprises a first arm 19 articulated on the piston rod 11, a second arm 17 articulated on one end of a synchronization bar 9, and a third arm 15 articulated on one end of a first turnbuckle 6a, an opposite end of which is articulated on a clevis 5a of the first ring 5, and
a second connection system comprising a second three-joint bellcrank 8; the bellcrank 8 is articulated about a pivot 21 on the control box 12 and comprises a first arm 18 articulated on an opposite end of the synchronization bar 9, and a second arm 16 articulated on one end of a second turnbuckle 6b, an opposite end of which is articulated on a clevis 5b of the second ring 5.

In the example shown in FIG. 2, the arm 19 of the bellcrank 7 is substantially flat. The end of the arm 19 connected to the piston rod 11 is located in a plane P which passes substantially through the middle of the axle 23 for articulating this end. This plane P also passes through the opposite end of the arm 19 connected to the pivot 20.

However, in certain configurations responding to cluttering problems, the opposite ends of the arm 19 for connecting the bellcrank 7 to the piston rod 11 are located in two parallel planes and spaced apart from each other. In operation, this type of configuration leads to significant forces in the bellcrank, which can wear out quickly or even break. One of the main causes of this wear is the moment generated at the level of the pivot. This is because the pivot connection to the control box receive an off-axis force with respect to its center of rotation.

The present invention provides a solution to this problem that is simple, effective and economical.

SUMMARY OF THE INVENTION

The present invention proposes a bellcrank for a variable adjustment device for an aircraft turbomachine, this bellcrank comprising a one-part body comprising a first articulation part configured to be connected to a control box of the device, a second articulation part configured to be connected to a synchronization bar of the device, a third articulation part configured to be connected to a piston rod of an actuator of the device, and a fourth articulation part configured to be connected to a turnbuckle of the device, the third part comprising a first tab which comprises a first orifice configured to receive an axle for articulating the piston rod and which extends in a plane P substantially perpendicular to the axis of this orifice, characterized in that the first part comprises a second tab extending substantially in said plane P and a tubular portion at a distance from said plane P, the second tab and the tubular portion comprising orifices with aligned axes which are configured to receive a common axle for articulating the control box and which are substantially parallel to the first orifice, the second tab being separated from the tubular portion by a free space.

Without the second tab, the pivot connection of the bellcrank to the control box would receive an off-axis force, from the center of rotation passing through the middle of the tubular portion. The presence of the second tab allows at least a part of the moment applied in operation that apply at the level of to the tubular portion and the pivot to be taken up, and thus to limit the stresses in the transmission of force in the bellcrank. Not changing or moving the axles for articulating the bellcrank allow that the adjustment law is not changed.

The bellcrank according to the invention may comprise one or more of the following characteristics, taken alone or in combination with each other:

said body comprises an L-shaped arm which comprises two substantially perpendicular branches, a first one of these branches being connected to the tubular portion and the other one of these branches being connected to the first and second tabs;

the body comprises third and fourth tabs substantially parallel to each other and to said plane P, these third and fourth tabs comprising first orifices having aligned axes for receiving a common axle for articulating said turnbuckle, and second orifices having aligned axes for receiving another common axle for articulating said synchronization bar;

the tubular portion has a length greater than a distance between said third and fourth tabs;

the tubular portion is separated from the second tab by a distance greater than or equal to a thickness of this second tab;

each of the orifices in the tubular portion and the second tab is through-going, the orifices being separated by the free space.

The present invention also relates to a variable adjustment device for an aircraft turbomachine, comprising at least one bellcrank as described above. Advantageously, the device is adapted to control at least two annular rows of stationary vanes, the vanes of each row being distributed about an axis inside a casing and each comprising at their radially external end a pivot defining a substantially radial axis for adjusting the vane, the device comprising:

an actuator comprising a cylinder intended to be attached to the casing and a piston rod, first and second control rings intended to be rotatably mounted around said casing, each control ring being intended to be connected by connecting rods to the pivots of the vanes of one of said rows, a control box, a first connection system comprising a first bellcrank as defined above, this first bellcrank being articulated respectively on the control box, on the piston rod, on one end of a synchronization bar, and on one end of a first turnbuckle, an opposite end of which is articulated on a clevis of the first ring, and a second connection system comprising a second bellcrank which is articulated respectively on the control box, on an opposite end of the synchronization bar, and on one end of a second turnbuckle, an opposite end of which is articulated on a clevis of the second ring.

Preferably, the control box comprises a housing for receiving the tubular portion of the first bellcrank, this housing being delimited between two walls of the control box which are substantially parallel and which comprise orifices for mounting said common axle for articulating the control box, one of these walls being intended to be interposed between the tubular portion and the aforementioned second tab.

The present invention also relates to a turbomachine, in particular of aircraft, comprising at least one device as described above.

BRIEF DESCRIPTION OF FIGURES

The invention will be better understood and further details, characteristics and advantages of the invention will become apparent from the following description made by way of non-limiting example with reference to the attached drawings, in which.

DETAILED DESCRIPTION OF THE INVENTION

Figure 1:
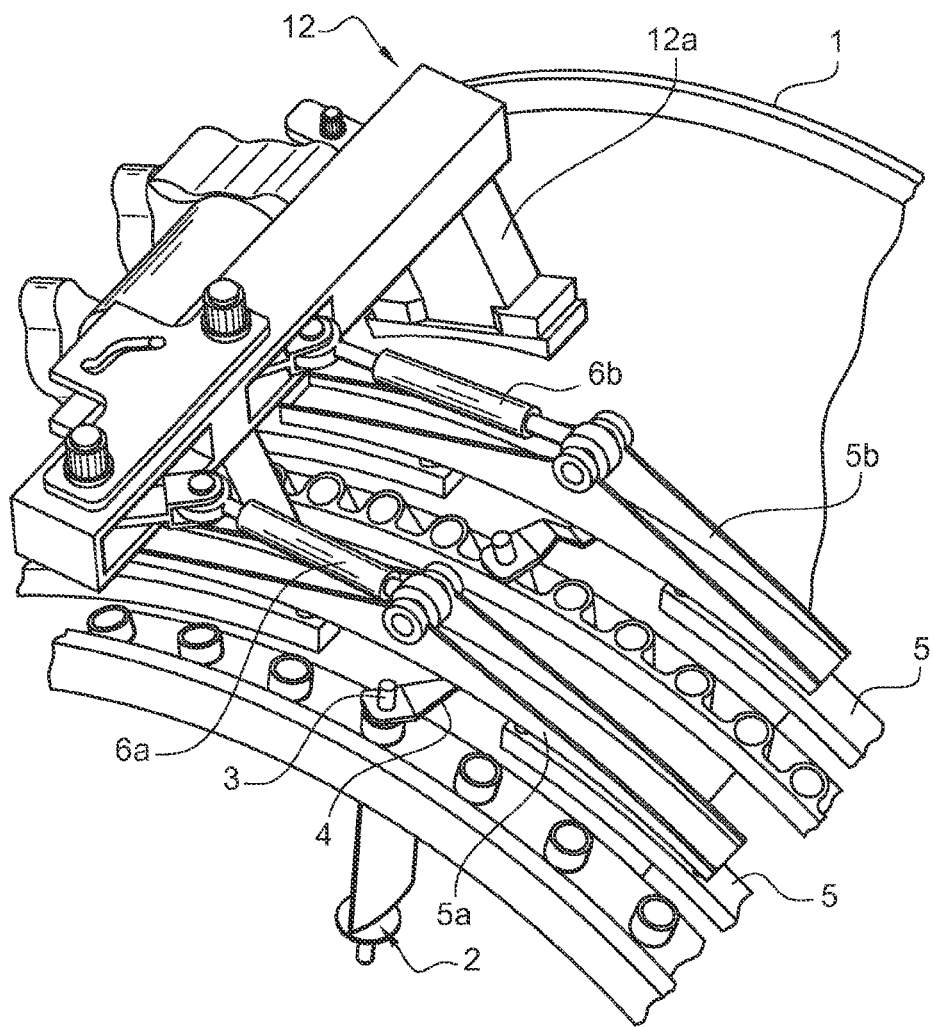
FIG. 1 is a partial schematic perspective view of a turbomachine.

FIG. 1 shows a part of an aircraft turbomachine and in particular a compressor, in this case high pressure, of the turbomachine.

The compressor comprises stages of compression vanes, each stage comprising an annular row of stationary vanes or stator vanes and an annular row of movable vanes or rotor vanes. The rows of vanes extend around a same axis, which is the longitudinal axis of the turbomachine.

The first row of vanes, i.e., those furthest upstream in the compressor (in reference to the flow of the gas, from upstream to downstream, in the turbomachine), is referred to as inlet stator vanes or RDE. The next row of stationary vanes, located downstream, is referred to as stator vane stage 1 or RD1.

The vanes of the rows RDE and RD1 are surrounded by an annular stator casing 1 centered on the axis of the turbomachine. Only one vane 2 is shown in the drawing.

Each vane 2 comprises a blade which is connected at its radially external end by a plate of substantially circular outline to a radial cylindrical pivot 3 which defines the axis of rotation of the vane and which is guided in rotation in a corresponding orifice in the external casing 1. The radially internal end of the blade of each vane generally comprises a second cylindrical pivot extending along the axis of rotation of the vane and rotatably guided in an orifice in an internal casing of the compressor (not shown).

The radially external end of the external pivot 3 of each vane is connected by a lever or a connecting rod 4 to a control ring 5 rotated around the casing 1 by a variable adjustment device. The rotation of the ring is transmitted by the connecting rods 4 to the external pivots 3 of the vanes 2 and makes them rotate around their axes.

Figure 2:
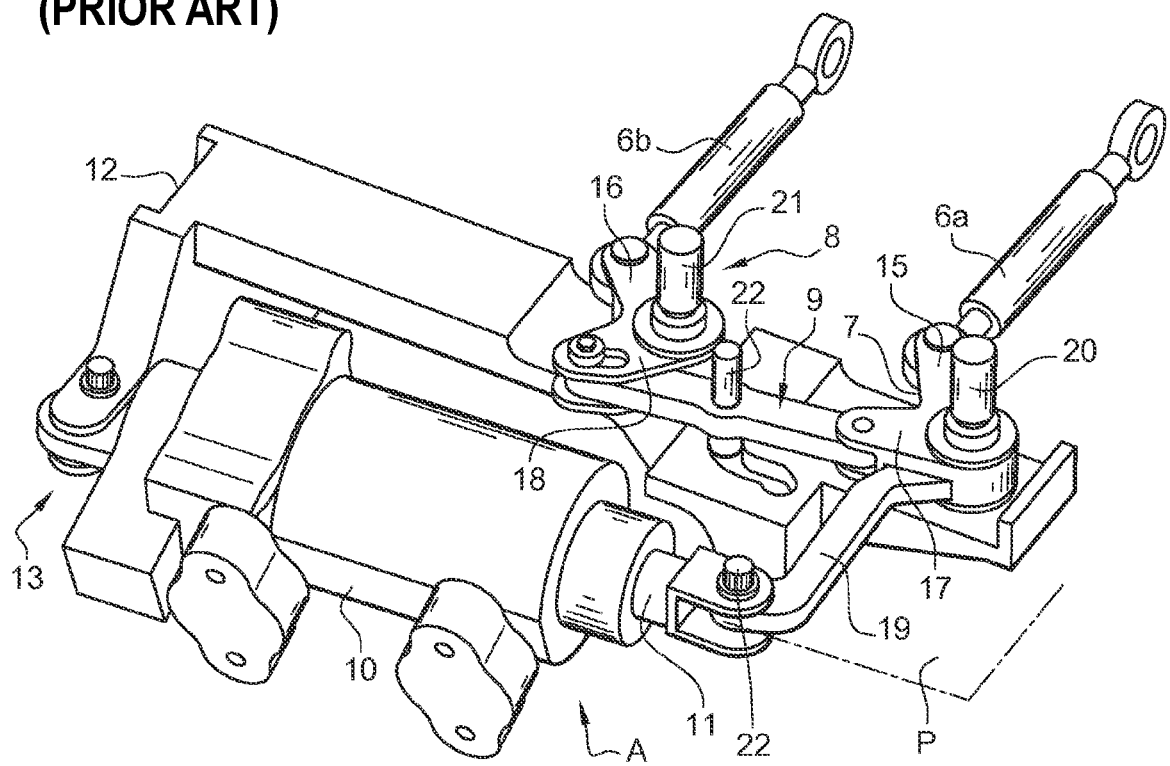
FIG. 2 is a schematic perspective view of a variable adjustment device of the turbomachine of FIG. 1.

The adjustment device, best seen in FIG. 2, is used for the simultaneous variable adjustment of the two rows RDE and RD1 and comprises:

an actuator A comprising a cylinder 10 attached to the casing 1 and a piston rod 11, a control box 12 attached to the casing 1, a first connection system comprising a first four-joint bellcrank 7; the bellcrank 7 is articulated about a pivot 20 on the control box 12 and comprises a first arm 19 articulated on the piston rod 11, a second arm 17 articulated on one end of a synchronization bar 9, and a third arm 15 articulated on one end of a first turnbuckle 6a, an opposite end of which is articulated on a clevis 5a of the control ring 5 of the row RDE, and a second connection system comprising a second three-joint bellcrank 8; the bellcrank 8 is articulated about a pivot 21 on the control box 12 and comprises a first arm 18 articulated on an opposite end of the synchronization bar 9, and a second arm 16 articulated on an end of a second turnbuckle 6b, an opposite end of which is articulated on a clevis 5b of the control ring 5 of the row RD1.

In order to limit the measuring chains and to facilitate the assembly of the assembly, the actuator A and the connection systems are carried by the control box 12 which is attached to the casing 1. This box 12 comprises one or more tabs 12a for attaching to the casing, for example by means of screwnut type means and comprises means 13 for attaching the cylinder 10 of the actuator A. The box 12 also comprises housings for mounting the bellcranks 7, 8 and orifices for mounting the pivots 20, 21 for articulating the bellcranks, or even an additional pivot 22 for guiding the synchronization bar 9. The axles for articulating the pivots 20, 21 and the arms of the bellcranks 7, 8 are substantially parallel.

When the piston rod 11 is retracted or extended relative to the cylinder 10, the bellcrank 7 rotates about the axis of its pivot 20. This rotation will cause a translation of the turnbuckle 6a and thus a rotation of the control ring 5 of the row RDE, as well as a displacement of the synchronization bar 9. This causes the bellcrank 8 to rotate about the axis of its pivot 21, which will result in a translation of the turnbuckle 6b and thus a rotation of the control ring 5 of the row RD1.

In the example shown in FIG. 2, the arm 19 of the bellcrank 7 is substantially flat. The end of the arm 19 connected to the piston rod 11 is located in a plane P which passes substantially through the middle of the axle 23 for articulating this end. This plane P also passes through the opposite end of the arm 19 connected to the pivot 20.

Figure 3:
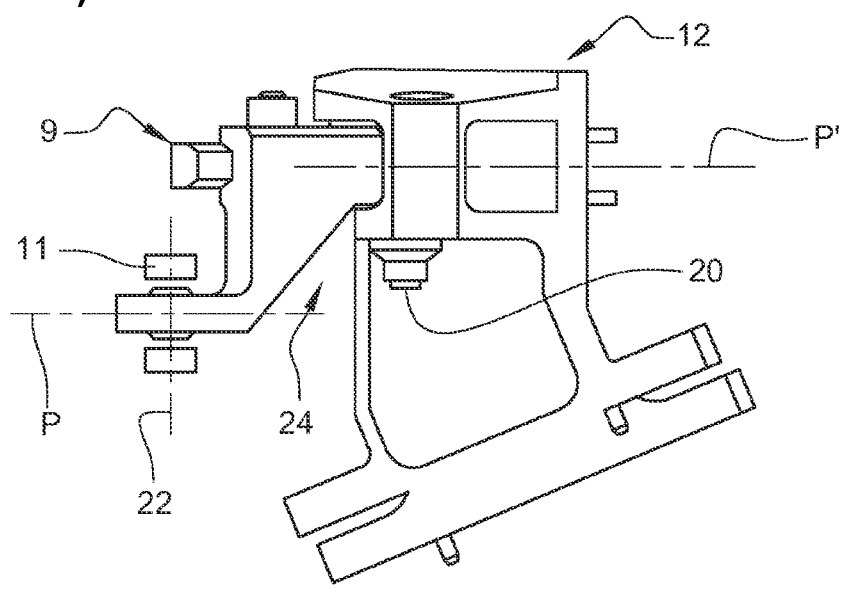
FIG. 3 is a schematic perspective view of a non-planar bellcrank and a control box for a variable adjustment device of a turbomachine.

However, in certain configurations responding to cluttering problems, the bellcrank for connecting the control box 12 to the piston rod 11 has ends articulated in two parallel planes P and P' and spaced apart from each other, as illustrated in FIG. 3.

Figure 4:
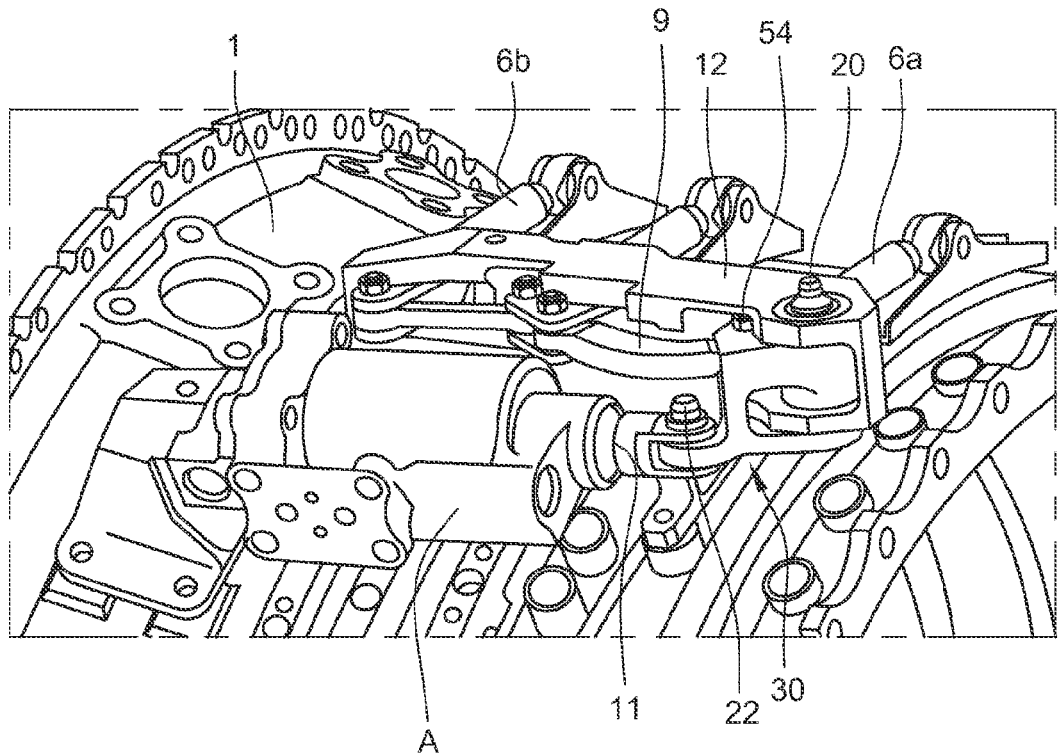
FIG. 4 is a schematic perspective view of a variable adjustment device according to the invention.
Figure 5:
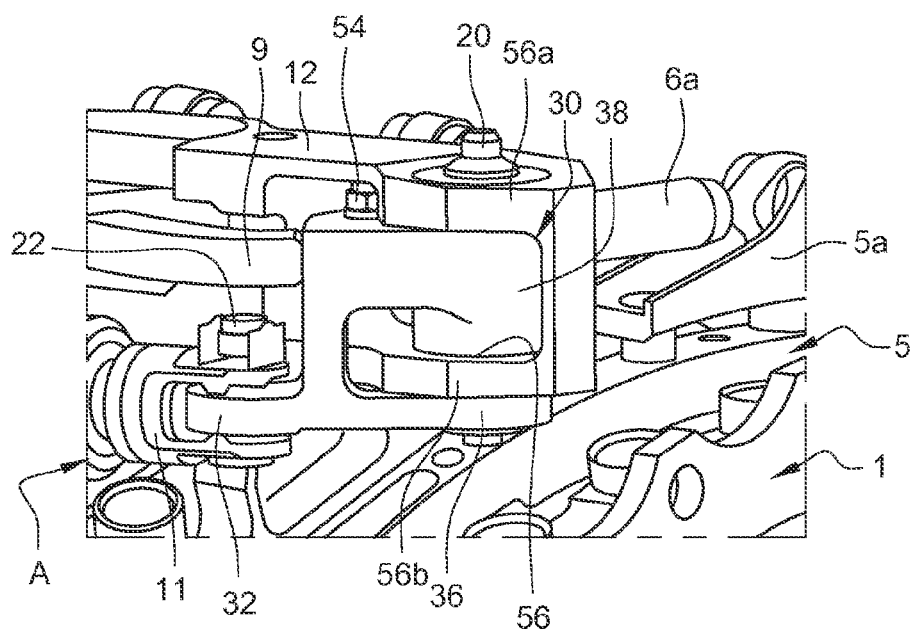
FIG. 5 is a larger scale schematic perspective view of a bellcrank of the device in FIG. 4.
Figure 6:
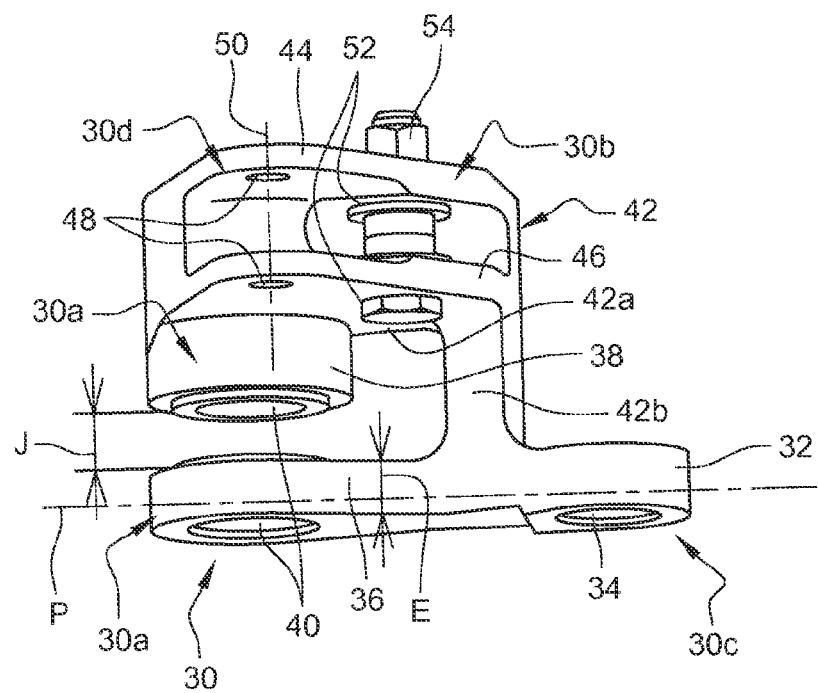
FIG. 6 is another schematic perspective view of the bellcrank of FIG. 5.

In operation, this type of configuration leads to significant forces in the bellcrank 24, which can wear out quickly or even break. One of the main causes of this wear is the moment generated at the level of the pivot 20. Indeed, the pivot connection to the control box 12 receives an off-axis force with respect to its center of rotation located at the level of the plane P'. The invention provides a solution to this problem, an embodiment of which is illustrated in FIGS. 4 to 6.

In this embodiment, the bellcrank 30 comprises a one-part body comprising:
a first articulation part 30a configured to be connected to the control box 12,
a second articulation part 30b configured to be connected to the synchronization bar 9,
a third articulation part 30c configured to be connected to the piston rod 11 of the actuator A, and
a fourth articulation part 30d configured to be connected to the turnbuckle 6a.

The third part 30c comprises a first tab 32 comprising an orifice 34 configured to receive the axle 22 for articulating the piston rod 11. This tab 32 extends in the plane P which is substantially perpendicular to the axis of the orifice 34.

The first part 30a comprises, on the one hand, a second tab 36 extending substantially in the plane P, and, on the other hand, a tubular portion 38 at a distance from this plane P. The tab 36 and the tubular portion 38 comprise aligned orifices 40 which are configured to receive a common axle for articulating the control box 12 and which forms the aforementioned pivot 20. The second tab 36 and the tubular portion 38 are separated by a free space. By free space, it is understood that when the common articulating axle is not arranged in the orifices 40, no element connects the second tab 36 to the tubular portion 38.

Each of the orifices 40 in the tubular portion 38 and in the second tab 36 is through-going, the orifices 40 being separated by the free space.

In the illustrated example, the body of the bellcrank 30 comprises an L-shaped arm 42 that comprises two substantially perpendicular branches 42a, 42b. A first branch 42a is connected to the tubular portion 38 and a second branch 42b is connected to the tabs 32, 36. The tabs 32, 36 extend in the plane P in substantially opposite directions.

The arm 42 thus supports the tubular portion 38 which is held at a distance from the tab 36. This distance J may be greater than or equal to the thickness E of the tab 36. The arm 42 is connected here to the upper end of the tubular portion 38.

The body of the bellcrank 30 also comprises third and fourth tabs 44, 46 substantially parallel to each other and to the plane P. These tabs 44, 46 are spaced apart from each other and comprise first aligned orifices 48 for receiving a common axle 50 for articulating the turnbuckle 6a, and second aligned orifices 52 for receiving another common axle 54 for articulating the synchronization bar 9.

Here, the tabs 44, 46 extend along the branch 42a of the arm 42 on a same side thereof. The tab 44 is located above the tab 46 and extends substantially through the upper end of the tubular portion 38. The tab 44 passes substantially through the middle of the tubular portion 38.

It is therefore understood that the tubular portion 38 has a length greater than the distance between the tabs 44, 46. This distance is chosen to accommodate the end of the synchronization bar 9 as well as the end of the turnbuckle 6a.

As shown in FIG. 5, the control box 12 comprises a housing 56 for receiving the tubular portion 38 of the bellcrank 30. This housing 56 is delimited by two walls 56a, 56b of the control box 12 which are substantially parallel and which comprise orifices for mounting the pivot 20.

The lower wall 56b is intended to be interposed between the tubular portion 38 and the tab 36 and therefore has a thickness less than the distance J. The pivot 20 passes through the orifices of the tab 36, the tubular portion 38 and the walls 56a, 56b.

Figure 7:
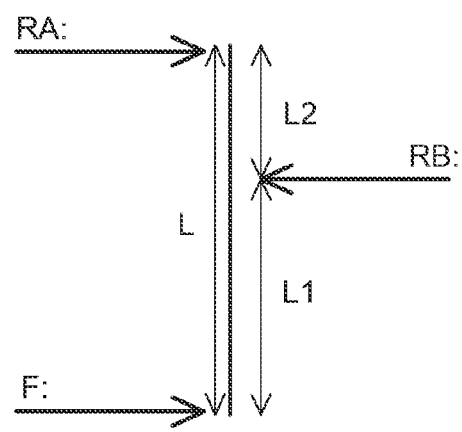
FIG. 7 is a graph showing the impact of the force transmitted by the actuator of the device on the reactions at the upper and lower ends of a bellcrank.

FIG. 7 shows schematically the reduction of the forces in the bellcrank 30 due to the invention. L corresponds to the height of the bellcrank 30 and thus to the length of the branch 42b of the arm 42. The arrow F corresponds to the force transmitted by the piston rod 11 of the cylinder, the arrow RA corresponds to the reaction of the bellcrank at the level of the upper end of the tubular portion 38, and the arrow RB corresponds to the reaction of the bellcrank as a function of the position of the tab 36 along the branch 42. The reduction of the forces in the bellcrank can be estimated via the following equilibrium equations:

$$RA = L1/L2 \times F$$

$$RB = L/L2 \times F$$

We can see that the more L1 tends to 0 and the more L2 tends to L, the more the reactions on the bellcrank decrease. This is what the proposed solution with the tab 36 advantageously located in the plane P, i.e. with L=L2, comes close to.

In a particular embodiment of the invention, L may be between 20 and 60 mm and is for example 40 mm.

The invention claimed is:
1. A variable adjustment device for an aircraft turbomachine, comprising:

a bellcrank comprising:
  a one-part body comprising a first articulation part connected to a control box of the variable adjustment device,
  a second articulation part connected to a synchronization bar of the variable adjustment device,
  a third articulation part connected to a piston rod of an actuator of the variable adjustment device, and
  a fourth articulation part connected to a turnbuckle of the variable adjustment device,
  the third part comprising a first tab which comprises a first orifice configured to receive an axle for articulating the piston rod and which extends in a plane perpendicular to a first axis of the first orifice,
  wherein the first part comprises a second tab extending in said plane and a tubular portion at a distance from said plane, the second tab and the tubular portion comprising second orifices with aligned second axes which are configured to receive a common axle for articulating the control box and which are parallel to the first axis of the first orifice, the second tab being separated from the tubular portion by a free space,
  wherein the one-part body comprises third and fourth tabs parallel to each other and to said plane, the third and fourth tabs comprising third orifices having aligned third axes for receiving a common axle for articulating said turnbuckle, and fourth orifices having aligned fourth axes for receiving a common axle for articulating said synchronization bar, and
  wherein the tubular portion has a length greater than a distance between said third and fourth tabs.

2. The variable adjustment device according to claim 1, wherein the variable adjustment device is configured for controlling at least two annular rows of stationary vanes, the stationary vanes of each annular row being distributed about a longitudinal axis inside a casing and each comprising at a radially external end a pivot defining a radial axis for adjusting the stationary vane of each stationary vanes, wherein:
  a cylinder is configured to be attached to the casing;
  first and second control rings are configured to be rotatably mounted around said casing, each of the first control ring and second control ring being configured to be connected by connecting rods to the pivots of the stationary vanes of one of said annular rows;
  a first connection system comprising the bellcrank, the bellcrank being articulated respectively on the control box, on the piston rod, on one end of the synchronization bar, and on one end of the turnbuckle, an opposite end of which the first turnbuckle is articulated on a clevis of the first ring; and
  a second connection system comprising a second bellcrank, the second bell crank articulated respectively on the control box, on an opposite second end of the synchronization bar, and on one end of a second turnbuckle, an opposite end of which the second turnbuckle is articulated on a clevis of the second ring.

3. The variable adjustment device according to claim 1, wherein the control box comprises a housing configured for receiving the tubular portion of the bellcrank, the housing being delimited between two walls of the control box which are parallel and which comprise orifices configured for mounting said common axle for articulating the control box, one of the two walls being configured to be interposed between the tubular portion and the second tab.

4. An aircraft turbomachine, comprising at least one variable adjustment device according to claim 1.

5. A bellcrank for a variable adjustment device for an aircraft turbomachine, comprising: a one-part body comprising:
  a first articulation part configured to be connected to a control box of the variable adjustment device;
  a second articulation part configured to be connected to a synchronization bar of the variable adjustment device;
  a third articulation part configured to be connected to a piston rod of an actuator of the variable adjustment device; and
  a fourth articulation part configured to be connected to a turnbuckle of the variable adjustment device, the third part comprising a first tab which comprises a first orifice configured to receive an axle for articulating the piston rod and which extends in a plane perpendicular to a first axis of the first orifice,
  wherein the first part comprises a second tab extending in said plane and a tubular portion at a distance from said plane, the second tab and the tubular portion comprising second orifices with aligned second axes which are configured to receive a common axle for articulating the control box and which are parallel to the first axis of the first orifice, the second tab being separated from the tubular portion by a free space,
  wherein the one-part body comprises third and fourth tabs parallel to each other and to said plane, the third and fourth tabs comprising third orifices having aligned third axes for receiving a common axle for articulating said turnbuckle, and fourth orifices having aligned fourth axes for receiving a common axle for articulating said synchronization bar, and
  wherein the tubular portion has a length greater than a distance between said third and fourth tabs.

6. The bellcrank according to claim 5, wherein said one-part body comprises an L-shaped arm which comprises two perpendicular branches, wherein a first branch of the two perpendicular branches is connected to the tubular portion and a second branch of the two perpendicular branches is connected to the first and second tabs.

7. The bellcrank according to claim 5, wherein the tubular portion is separated from the second tab by a second distance greater than or equal to a thickness of the second tab.

8. The bellcrank according to claim 7, wherein each of the second orifices in the tubular portion and the second tab is through-going, the second orifices being separated by the free space.

9. The bellcrank according to claim 5, wherein the free space extends from the tubular portion to the second tab.

10. The bellcrank according to claim 5, wherein the free space is aligned with the second axes.

11. A variable adjustment device for an aircraft turbomachine, comprising:
  first and second bellcranks, the first bellcrank comprising:
    a one-part body comprising a first articulation part connected to a control box of the variable adjustment device,
    a second articulation part connected to a synchronization bar of the variable adjustment device,
    a third articulation part connected to a piston rod of an actuator of the variable adjustment device, and
    a fourth articulation part connected to a turnbuckle of the variable adjustment device,
    the third part comprising a first tab which comprises a first orifice configured to receive an axle for articulating the piston rod and which extends in a plane perpendicular to a first axis of the first orifice, wherein the first part comprises a second tab extending in said plane and a tubular portion at a distance from said plane, the second tab and the tubular portion comprising second orifices with aligned second axes which are configured to receive a common axle for articulating the control box and which are parallel to the first axis of the first orifice, the second tab being separated from the tubular portion by a free space, wherein the variable adjustment device is configured for controlling at least two annular rows of stationary vanes, the stationary vanes of each annular row being distributed about a longitudinal axis inside a casing and each comprising at a radially external end a pivot defining a radial axis for adjusting the stationary vane of each stationary vanes, wherein:

a cylinder is configured to be attached to the casing;

first and second control rings are configured to be rotatably mounted around said casing, each of the first control ring and second control ring being configured to be connected by connecting rods to the pivots of the stationary vanes of one of said annular rows;

a first connection system comprises the first bellcrank, the first bellcrank being articulated respectively on the control box, on the piston rod, on one end of the synchronization bar, and on one end of the turnbuckle, an opposite end of which the turnbuckle is articulated on a clevis of the first ring; and a second connection system comprises the second bellcrank, which is articulated respectively on the control box, on an opposite second end of the synchronization bar, and on one end of a second turnbuckle, an opposite end of which the second turnbuckle is articulated on a clevis of the second ring;

wherein the control box comprises a housing configured for receiving the tubular portion of the first bellcrank, the housing being delimited between two walls of the control box which are parallel and which comprise orifices configured for mounting said common axle for articulating the control box, one of the two walls being configured to be interposed between the tubular portion and the second tab.

* * * * *